J. E. NOEGGERATH.
DYNAMO ELECTRIC MACHINE.
APPLICATION FILED APR. 21, 1910.
1,043,028.
Patented Oct. 29, 1912.
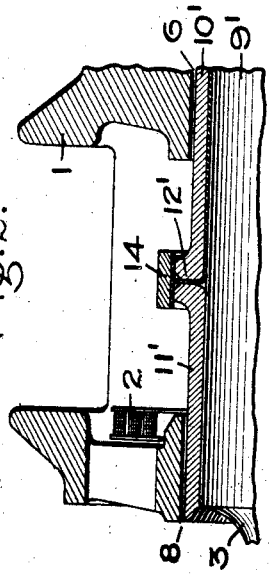
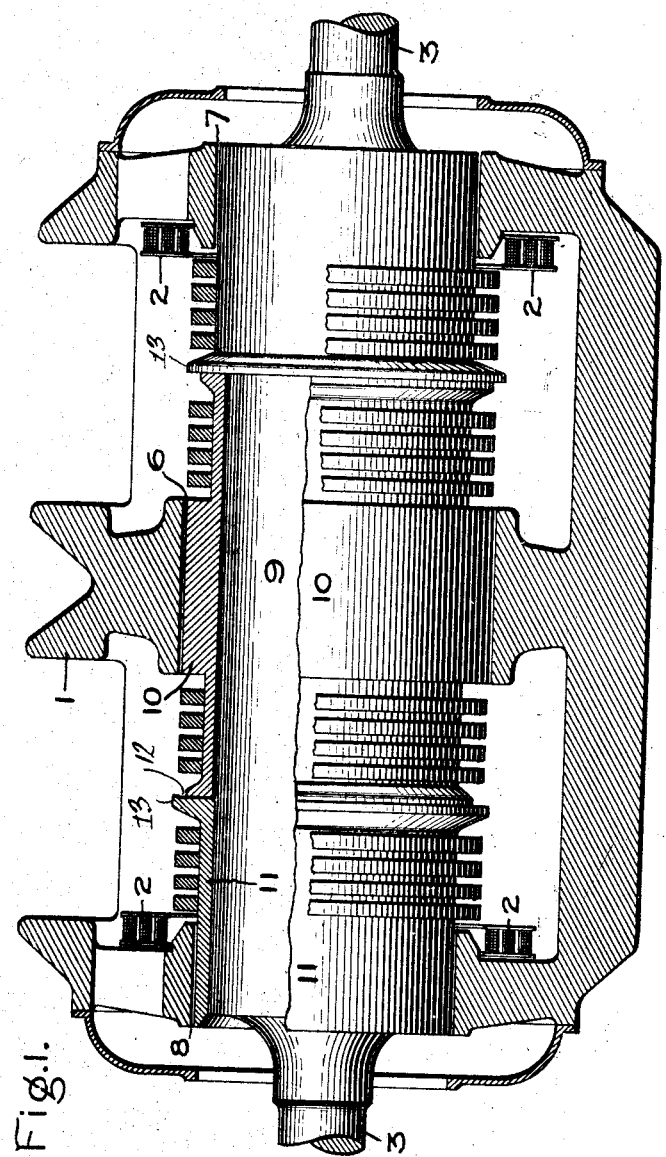
Witnesses:
J. Ellis Glen
T. William Noonan
Inventor:
Jakob E. Noeggerath,
by Albert G. Davis
His Attorney.

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

DYNAMO-ELECTRIC MACHINE.

1,043,028.     Specification of Letters Patent.     Patented Oct. 29, 1912.

Application filed April 21, 1910. Serial No. 556,656.

*To all whom it may concern:*

Be it known that I, JAKOB E. NOEGGERATH, a citizen of the United States, residing at Schenectady, county of Schenectady, State of New York, have invented certain new and useful Improvements in Dynamo-Electric Machines, of which the following is a specification.

My invention relates to dynamo electric machines of the type known as "unipolar", and has special reference to low voltage machines in which armature conductors are dispensed with.

It is the object of my invention to so construct a machine of this character that a plurality of voltages may be generated in a machine in which the whole armature body forms the active material in which the electromotive force of the machine is induced.

My invention consists in an armature body rotatably mounted in a unipolar field structure, said body comprising two conducting portions insulated from each other, one portion being reduced in diameter for a part of its length and the other portion fitting over the part reduced in diameter. By so constructing a unipolar machine and by connecting the two portions of the armature in series with the outside circuit, I am enabled to operate it at substantially double the voltage that can be obtained from the machine heretofore employed, in which the whole armature body forms the active material in which the electromotive force of the machine is induced. By arranging the portions of the armature body so that they have the same outside diameter and a small radial non-magnetic gap between the portions, the greatest flux carrying section for a given peripheral speed can be used.

My invention will best be understood by reference to the following description taken in connection with the accompanying drawing, in which—

Figure 1 is a view, partly in section, of a unipolar machine embodying my invention; and Fig. 2 is a sectional view of a modification.

Similar reference numerals will be used throughout the specification and the several figures of the drawing to denote like parts.

In Fig. 1, 1 represents the field structure, provided with suitable magnetizing coils 2 and arranged to produce a unipolar field flux. The armature body is rotatably mounted in the field and is carried on a suitable shaft 3. It is provided with two sets of collector rings at opposite ends of the armature. The flux may be considered as entering the armature body at the central air gap 6 between the two sets of collector rings and there dividing, passing axially through the armature and returning outwardly into the field structure through the right and left air gaps 7 and 8. The collector rings may be in contact with the armature around its entire periphery, in which case the collecting brushes should be distributed around the collector rings so as to avoid eddy current losses, or the arrangement shown in my Patent No. 805,315, dated Nov. 21, 1905, may be used.

The armature body comprises two conducting portions 9 and 10 insulated from each other, the portion 10 surrounding the portion 9. The portion 9, which is cylindrical in shape, is preferably reduced in diameter where the portion 10, which is in the form of a shell, fits thereon, so that the outside diameters of both portions on which the collector rings are located are the same. In this case, after the portion or shell 10 is placed in position on the portion 9 of the armature body, a sleeve or shell 11 is shrunk or otherwise suitably fitted on the portion 9 of the armature body so as to make both ends of the armature of the same diameter. By shrinking the sleeve 11 in place a good electrical contact is made. From the above description, it will be seen that both portions of the armature body carry the flux and at the same time act as conducting bodies independent of each other. The insulation separating the shell 10 from the sleeve 11 and the portion 9 of the armature, forms at the ends of the shell, radial non-magnetic gaps 12. Preferably, the sleeve 11 and the shell 10 have their abutting ends enlarged so that the reluctance of the non-magnetic gap 12 between them, is decreased. In the form shown in Fig. 1, the sleeve 11 has a part 13 which overhangs the insulation to keep it in place against centrifugal force. Half of each set of collector rings is mounted on the shell 10, the other half of the set on one end of the armature is mounted on the portion 9 and the other half of the set on the other end of the armature is mounted on the sleeve 11. The number of collector rings used depends on the amount of current to be collected, a greater number being used when large currents are to be collected than when small currents are to be collected in order to reduce the contact resistance of the brushes.

In the modification shown in Fig. 2, the collector rings are dispensed with and the current is collected directly from the portions 9' and 10'. In Fig. 2, the enlarged ends of the sleeve 11' and shell 10' have the same outside diameter and the insulation is held in place against centrifugal force by the band 14.

I desire it to be understood that my invention is not limited to the particular construction shown and described, and I aim in the appended claims to cover all modifications which do not depart from the spirit and scope of my invention.

What I claim as new and desire to secure by Letters Patent of the United States, is,—

1. In a dynamo electric machine, a unipolar field structure, an armature body rotatably mounted in said field comprising two conducting portions insulated from one another, one of which is reduced in diameter for a part of its length and the other is in the form of a shell fitting over said part reduced in diameter, collector rings on both of said portions of the armature body near the ends thereof, the outside diameters of both portions on which the collector rings are located, being substantially the same.

2. In a dynamo electric machine, a unipolar field structure, an armature body comprising a cylindrical conducting portion reduced in diameter for a part of its length, a conducting shell fitting over said part reduced in diameter and insulated therefrom, and a sleeve also fitting over said part reduced in diameter but in electrical contact therewith.

3. In a dynamo electric machine, a unipolar field structure, an armature body comprising a cylindrical conducting portion reduced in diameter for part of its length, a conducting shell fitting over said part reduced in diameter, and a sleeve also fitting over said part reduced in diameter and in electrical contact therewith, said shell being separated from said portion and said sleeve by radial non-magnetic gaps.

4. In a dynamo electric machine, a unipolar field structure, an armature body comprising a cylindrical conducting portion reduced in diameter for part of its length, a conducting shell fitting over said part reduced in diameter and a sleeve also fitting over said part reduced in diameter and in electrical contact therewith, said sleeve and shell having their abutting ends enlarged, said shell being separated from said portion and said sleeve by radial non-magnetic gaps.

In witness whereof, I have hereunto set my hand this 18th day of April, 1910.

JAKOB E. NOEGGERATH.

Witnesses:
BENJAMIN B. HULL,
HELEN ORFORD.